INVENTOR.
JOHN E. AMES, JR.
BY
Lippincott, Ralls & Hendricson
ATTORNEYS 3,130,578
STRAIN GAUGE BRIDGE CALIBRATION
John E. Ames, Jr., Altadena, Calif., assignor to Fairchild Camera and Instrument Corporation, Syosset, N.Y., a corporation of Delaware
Filed Aug. 18, 1961, Ser. No. 132,501
3 Claims. (Cl. 73—88.5)

The present invention relates in general to an improvement in Wheatstone bridge-type transducers employing semiconductor elements, and more particularly, to calibration of such bridges under varying conditions.

Semiconductors are known to have strain-sensitive electrical characteristics, and inasmuch as current-voltage relationships in semiconducting materials are influenced by applied stress it is quite possible to form sensing units applicable as sensors in strain gauges, pressure transducers, accelerometers, and the like. By the application of suitable excitation along a crystal axis of chosen semiconductor materials, there are produced therefrom output variations dependent upon applied stress. Commonly, sensor units formed of semiconductor material are arranged in a Wheatstone bridge configuration to achieve the advantages of bridge circuitry, together with those of semiconductor sensors.

In the application of this type of transducer, it is normally required for some type of calibration or standardization to be provided. A conventional requirement in this respect is the production of simulated outputs as a percentage of full-scale output of the unit. For a Wheatstone bridge-type transducer, this may be quite readily accomplished by the connection of one or more calibrated resistances in parallel with an arm of the bridge. Commonly, this type of circuitry is employed to standardize the bridge transducer.

While the foregoing approach to the problem of bridge standardization in transducer units is commonly employed, it has been found that certain difficulties arise in connection therewith. Thus, for example, it is possible with such connections to provide for standardization of the bridge prior to utilization thereof. However, under actual operating conditions the prior standardization does not necessarily hold true. In fact, it is common that the prior standardization is substantially in error under the conditions of actual operation. This arises, at least in part, from the fact that semiconductors are temperature dependent insofar as the current-voltage characteristics thereof are concerned.

Many applications of semiconductor transducers require not only the standardization of bridge elements prior to operation, but also require standardization of the bridge under operating conditions. This latter requirement is normally not available with conventional bridge standardization techniques. Inasmuch as the bridge elements undergo variations in characteristics with changes in temperature, it will be appreciated that operating conditions or near operating conditions produce a bridge variation, so that prior standardization no longer is applicable. The utilization of fixed resistances in circuit with the bridge for standardization thus commonly does not serve to produce necessary standardization accuracy. The so-called "shunt output" has a different relation to the normal transducer output at elevated temperatures than it does at normal testing temperatures. Heretofore the only available method of compensating for this variation in relationship consisted of multiple testing wherein compensation was made for variations. Inasmuch as such compensations are necessarily manually accomplished, it will be appreciated that certain errors and difficulties are connected therewith.

The present invention provides for the utilization of temperature compensation in the standardization of semiconducting bridge transducers. The foregoing is the prime objective of the present invention, and is accomplished in fact through the provision of a shunt resistor having a suitably chosen temperature coefficient, and the location of same within the transducer unit itself. In this manner the present invention provides for the shunt resistor employed for bridge standardization to undergo the same temperature environment as the transducer semiconducting elements themselves, and furthermore provides that this shunt resistor shall have proper temperature coefficient to maintain a constant relationship between shunt output and normal output of the bridge transducer.

The present invention is illustrated with regard to a preferred embodiment thereof in the accompanying drawing, wherein.

Figure 1:
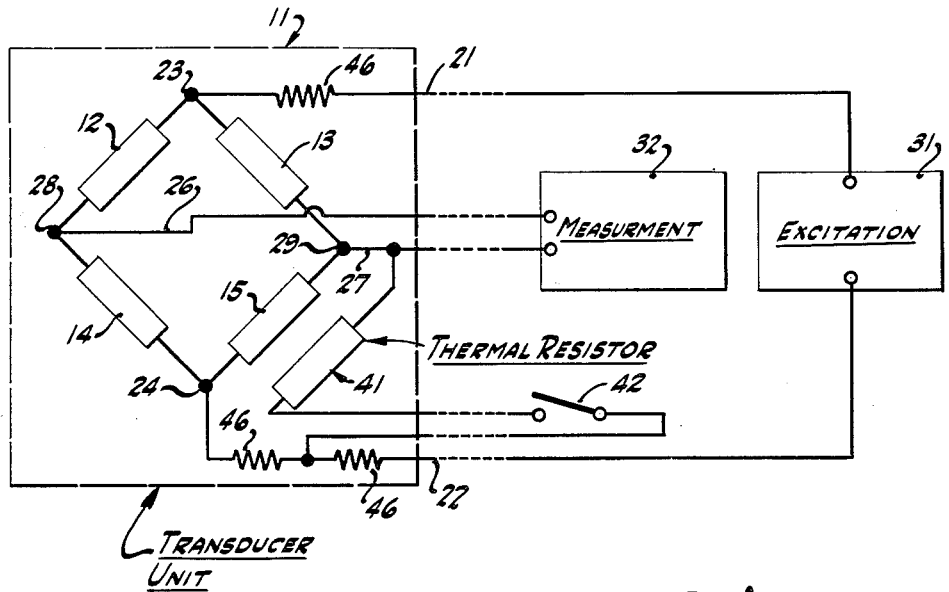
FIGURE 1 is a simplified circuit diagram of the present invention.

Considering now the present invention in somewhat greater detail, and referring to FIGURE 1 of the drawing, there will be seen to be illustrated a transducer unit 11 adapted to be disposed in a position for the production of electrical indications of stresses, for example. This transducer unit includes a semiconductor bridge formed of four semiconducting sensor elements 12, 13, 14, and 15, electrically connected together to form a Wheatstone bridge. This bridge is adapted to have excitation applied across one diagonal thereof, and to have measuring or indicating means connected across the other diagonal. Excitation leads 21 and 22 extend from opposite junctions 23 and 24 of the bridge of the transducer unit. Output leads 26 and 27 extend from alternate junctions 28 and 29 of the bridge.

The above-noted electrical conductors may extend some distance from the physical location of the transducer unit in position to produce electrical indications of applied stresses, and the excitation leads 21 and 22 are, as illustrated, connected to the plus and minus terminals, respectively, of an excitation source 31. The output leads 26 and 27, in turn, extend to plus and minus terminals, respectively, of measuring and indicating means 32. There may additionally be inserted in the excitation or output leads suitable resistors, as indicated.

Calibration or standardization of the bridge is achieved in accordance herewith by the inclusion in the transducer unit itself of one or more resistors, indicated at 41. This resistive unit 41 has a resistance value varying with temperature in a desired predetermined manner. The temperature coefficient of resistance of 41 is equal to or suitably correlated to the coefficient of the sensor elements of the bridge. The resistive unit 41 is electrically connected in shunt with a bridge arm and is illustrated as being connected between negative excitation and negative measurement leads 22 and 27, respectively. The resistor 41 is connected in circuit with the bridge by a switch 42 disposed remotely from the transducer unit in position for ready access by an operator or one checking the bridge calibration. There are preferably also included in the transducer trimming resistors 46 disposed in the excitation leads and having suitable small temperature coefficients of resistance for establishing final trim on the shunt to gauge correlation through temperature.

It will be noted that the shunt resistor 41 employed in the transducer unit is identified as a "thermal resistor" in FIGURE 1, this nomenclature denoting the variable temperature coefficient of resistance thereof and being hereinafter employed interchangeably with the term "thermistor," as a contraction of "thermal resistor." Inasmuch as various types of thermal resistors or thermistors are known in the art and are, in fact, commercially available, no further definition of the physical composition of same is herein included.

Figure 2:
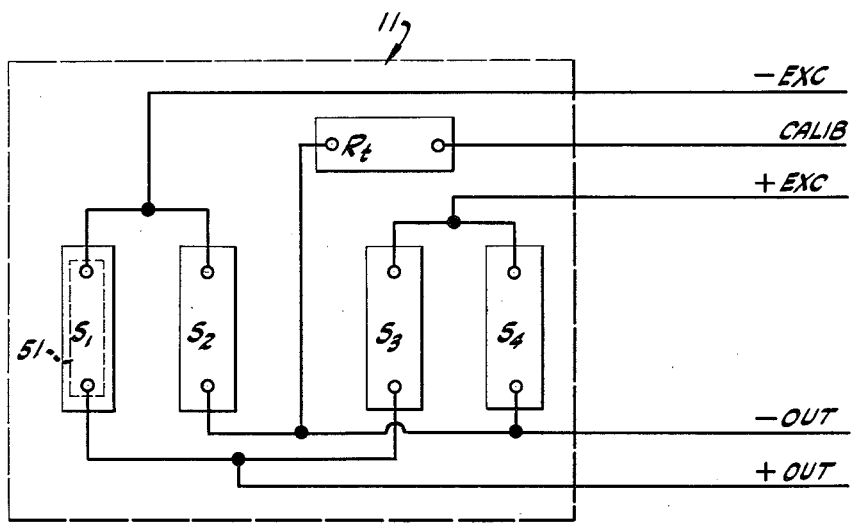
FIGURE 2 is a schematic illustration of a transducer unit itself, including the improvements of the present invention.

It is, however, of particular importance insofar as the present invention is concerned that the shunt resistor or thermistor 41 shall be physically located in close proximity to the sensor elements of a transducer unit, and furthermore, that the temperature coefficient of this thermistor shall be predetermined in order to achieve the accuracy of calibration or standardization herein required over a substantial range of temperatures. The transducer unit is additionally illustrated in FIGURE 2, particularly with one possible physical configuration of portions thereof, together with an identification of a suitable physical position of the thermal resistor within the transducer unit. As illustrated in FIGURE 2, individual sensor units S1, S2, S3, and S4 are disposed in close proximity within the transducer unit and may, for example, be physically mounted upon a beam, or the like, subjected to stresses to be determined. These individual sensor units may take a variety of configurations, and for example, may each comprise a small wafer of semiconducting material having a diffused layer or zone of selected impurity therein, as indicated at the dotted line 51 in S1, for example. Electrical connections are provided adjacent opposite ends of the layer 51, which in itself actually forms the strain-sensitive portion of the electrical circuit. This particular type of sensor structure is further disclosed in the copending U.S. patent application of Wendell M. Lafky, entitled "Semiconductor Strain Gauge," filed in the U.S. Patent Office on August 18, 1960, with Serial No. 50,510, and assigned to the same assignee as the present application. While this form of semiconductor strain gauge transducer is highly advantageous, it is not intended to limit the present invention to this particular structure, and such is included herein only as an example.

The electrical connections indicated in FIGURE 2 will be seen to define a Wheatstone bridge circuit including the four sensor elements S1 to S4 in the same manner as the circuit diagram of FIGURE 1. In addition to these four sensor elements within the actual transducer unit of the strain gauge, there is provided a thermistor labeled as $R_t$ and corresponding to the shunt resistor 41 identified in the circuit of FIGURE 1. It will be seen that this thermistor is disposed in close proximity to the sensor elements, so as to thereby experience the same temperature variations as such elements.

It will be seen from the schematic illustration of FIGURE 2 that the transducer unit package contains not only the individual sensor elements of the transducer, but in addition, contains in close, physical proximity therewith the shunt resistor employed for calibration of the transducer bridge. This shunt resistor $R_t$ has a thermal coefficient of resistivity which matches the coefficient of the bridge. In actual practice, and with the type of sensor elements briefly noted above, there may be employed a thermal resistor $R_t$ having a value of about 56,000 ohms to produce a 50 percent change in output of the bridge upon insertion of same in circuit therewith. Naturally, the value of the resistance inserted in the bridge circuit of the transducer unit is determined by the characteristics of the bridge and the desired change in normal output produced by the insertion of such shunt resistance. The foregoing value thus serves only as one possible example which has been employed in particular applications of this type of strain gauge. As a further exemplary value of the thermal resistor, same may have a temperature coefficient of thirteen percent per 100 degrees F. as a typical value which matches the temperature coefficient of a particular bridge circuit which has been utilized in the transducer unit of a strain gauge.

Operation or utilization of the present invention need not differ from conventional practices. With the unit completed it is normal to standardize or calibrate the bridge circuit by the insertion of shunt resistance across one arm of the bridge to produce a simulated output as a predetermined percentage of full-scale output of the device. It is, however, conventional for this fixed resistance to be inserted at the appropriate electrical terminations in the circuitry associated with the transducer unit, so that the resistor or resistors employed are physically located in the area of the measuring equipment. While such practices are quite suitable to produce an initial calibration, the present invention proceeds beyond this general proposition to afford calibration under operating conditions. As an example of strain gauge applications wherein the present invention is highly advantageous, consider the circumstances wherein the transducer unit 11 of a strain gauge is physically located in some relatively inaccessible position upon particular equipment such as a portion of a rocket system. Despite initial calibration or standardization of the bridge of the transducer unit, it will be appreciated that under test operations wherein the environment of a transducer unit varies, there often occurs a very substantial temperature variation at the physical location of this transducer unit. Such temperature variations produce rather substantial variations in the operating point of the bridge circuit, inasmuch as semiconducting materials have temperature-dependent characteristics. It is thus highly desirable and often necessary to re-perform calibration tests on the transducer unit subsequent to initial calibration and under widely different circumstances. In accordance herewith, the shunt resistor or thermistor 41 is electrically connected in shunt with one of the legs of the bridge under these altered circumstances merely by closing the indicated switch and there will then be produced the same indication at the measuring equipment 32 as was previously obtained with cold tests.

Variations in temperature at the transducer unit will thus not in any way disturb standardization or repeated standardization of the bridge circuit, for the calibrating shunt resistor maintains the same resistance relationship to the bridge circuit under different temperature conditions. There is consequently afforded hereby a material improvement in bridge standardization for semiconductor strain gauges, which is not available through conventional calibration operations. The physical placement of a thermistor of predetermined temperature coefficient within the transducer unit and in close proximity with the sensor elements thereof so as to experience the temperature variations, will be seen to provide herein for the maintenance of a highly desirable uniform relationship whereby bridge calibration may be checked under varying conditions. Only relatively minor structural changes are required in transducer units of the type herein described in order to carry out the present invention. The physical placement of one or more thermistors in the transducer package does not present any manufacturing problems. It does, however, provide for a material extension and improvement of the overall device, and does afford a fixed relationship between the shunt and normal outputs from the semiconductor bridge of the transducer over the operable temperature range of the instrument. It will, of course, be appreciated that more than one thermal resistor may be employed in accordance with the present invention, with the particular limitation that each thermal resistor so employed shall be physically disposed in close proximity to the sensing elements of the transducer and shall have a temperature coefficient which is predetermined to be substantially equal to or match the effective temperature coefficient of the transducer bridge. The utilization of a multiplicity of thermistors is required under conditions wherein calibration of the bridge is to be made at more than one point upon the output curve thereof. It is also to be noted that the shunt resistor or resistors herein provided by thermal resistors are physically disposed in the same environment as the sensing unit, so that the thermal resistors may be equally well connected between the plus excitation and plus measuring or output lead of the bridge. As regards electrical circuitry, the common practices in the art may be followed herein.

There will be seen to be provided by the present invention as above described, an advancement in semiconductor strain gauges, whereby results hitherto unavailable are quite readily and simply obtained.

What is claimed is:

1. An improved strain transducer comprising a plurality of strain-sensitive elements electrically connected together to form a transducer unit, said transducer unit being adapted for energization and measurement as to changes of electrical characteristics of the strain-sensitive elements responsive to applied forces, and a resistor of predetermined resistance having a temperature coefficient of resistance substantially matching the temperature coefficient and said strain-sensitive elements, said resistor being disposed in close proximity to said strain-sensitive elements for experiencing the same temperature variations as said elements, and said resistor being adapted for connection in shunt with one of said strain-sensitive elements to produce a simulated transducer output as a fixed ratio of full output.

2. An improvement in standardization of transducers having a plurality of sensing elements connected in circuit in a transducer unit for energization to produce output signals varying according to stresses applied to the transducer, comprising a thermal resistor disposed in said transducer in position to experience the same temperature variations as said transducer sensing elements, said thermal resistor having a predetermined ratio of resistance to the resistance of said individual sensing elements and having a temperature coefficient substantially equal to the temperature coefficient of said sensing elements, and means for connecting said thermal resistor in shunt with one of said sensing elements to produce a simulated output from the transducer for calibration thereof.

3. An improved means for calibrating a strain gauge transducer including strain-sensitive elements connected in a bridge circuit for energization across one bridge diagonal to produce output signals across the other diagonal so that measuring means connected across this latter diagonal indicates strain experienced by the transducer sensing elements, comprising a thermal resistor having a greater value of resistance than at least one sensing element and having substantially the same temperature coefficient of resistance as said sensing element, said resistor being physically disposed in close proximity with said sensing element to experience like temperature variations, and means removably connecting said resistor in parallel with said sensing element for producing a simulated transducer output to standardize measuring means and transducer output at varying temperatures of the transducer.

References Cited in the file of this patent

UNITED STATES PATENTS 3,034,345     Mason _____ May 15, 1962
3,046,782     Laimins _____ July 31, 1962

OTHER REFERENCES

"A Report on Wire Strain Transducer System Calibration," published by Allegany Instrument Co., Inc., Cumberland, Maryland (pp. 17 and 18 relied on).